Feb. 19, 1963  D. C. BOMBERGER  3,078,041
COLLISION COURSE VECTORING COMPUTER
Filed Aug. 16, 1957  2 Sheets-Sheet 1

$X_{TI} = X_T - X_I = R_T \sin \theta_T - R_I \sin \theta_I$
$Y_{TI} = Y_T - Y_I = R_T \cos \theta_T - R_I \cos \theta_I$ $(X_{TI} + \dot{X}_T t_1) \sin \beta + (Y_{TI} + \dot{Y}_T t_1) \cos \beta - V_I t_1 = 0$
$(X_{TI} + \dot{X}_T t_1) \cos \beta - (Y_{TI} + \dot{Y}_T t_1) \sin \beta = 0$ $\dot{Y}_I' \sin \beta' - \dot{X}_I' \cos \beta' = 0$

INVENTOR
DAVID C. BOMBERGER
BY
ATTORNEYS

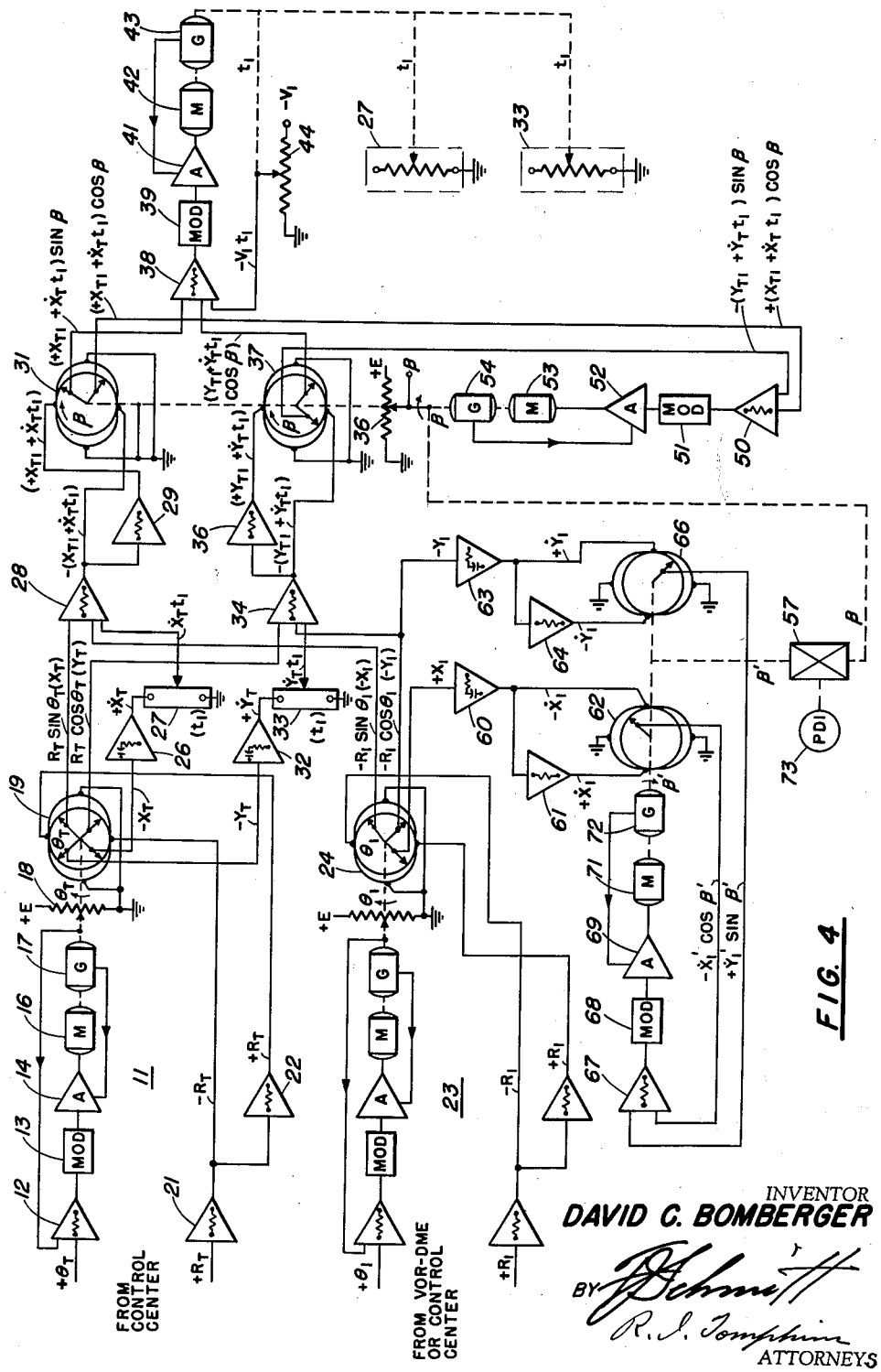

3,078,041
Patented Feb. 19, 1963

3,078,041
COLLISION COURSE VECTORING COMPUTER
David C. Bomberger, Plainfield, N.J., assignor, by mesne assignments, to the United States of America as represented by the Secretary of the Navy
Filed Aug. 16, 1957, Ser. No. 678,749
7 Claims. (Cl. 235—187)

The present invention relates to a navigation computer and more particularly to a collision course computer for directing the course of an interceptor during the vectoring phase of a target interception.

The term vectoring phase is used to denote the period between the launching of an interceptor and the point of lock-on of the interceptor's aircraft interception radar. During this phase the interceptor is directed, i.e., vectored, to intercept the target in accordance with the respective positions of the target and the interceptor with respect to a control center which may be, for example, a control aircraft, a ship, or a shore station. Vectoring of interceptors is necessary at the present time because there is available no adequate long range aircraft interception radar system. For a more complete discussion of the nature of the vectoring phase and the problems attendant thereto reference is made to copending application Serial No. 635,079, for Vectoring Phase Simulator, filed January 18, 1957, now U.S. Patent No. 2,971,269.

The course followed by the interceptor to the tally-ho position, i.e., the point of lock-on by the aircraft interception radar, may be either a predicted collision course or a proportional navigation course. In the collision course the interceptor is directed to assume a straight line course which will bring it into collision with the target at some future position, while in the proportional navigation course the interceptor is directed to assume a rate of turn that is proportional to the rate of change of the line of sight between the interceptor and the target. The present invention relates to a collision course computer. A proportional navigation computer is described in copending application Serial No. 635,078, for Proportional Navigation Computer, filed January 18, 1957, now U.S. Patent No. 3,013,722; the advantages of the proportional navigation course being fully set forth therein. In a collision course computer, assuming that the target continues with constant velocity, only one computation is required. Accordingly, in situations where the data rate (information on the positions of the target and the interceptor) is low, the collision course computer has obvious advantages. Further, as will be more fully apparent upon consideration of the detailed specification below, the time and place of collision are predicted by the collision course computer. This information is not available in a proportional navigation system.

During the vectoring phase the positions of the target may be determined by search radars under the direction of an interception control center and relayed thereto. The search radars may comprise shipborne air search and airborne early warning radars. The positions of the interceptor may be determined either by the same radar means that determines the positions of the target or by a separate navigation aid such as omnirange distance measuring equipment located in the interceptor. The vectoring computer may be located aboard the interceptor or at the control center. If the computer is located aboard the interceptor, target and interceptor position data may be relayed to the interceptor for example by a discreet address system and there made available as polar co-ordinate data in the form of direct input voltages for the computer. If, on the other hand, the computer is located at the control center, the bearing order and other information available from the computer may be relayed to the interceptor by the discreet address system to actuate appropriate indicators and aircraft control equipment.

Accordingly, it is an object of the present invention to provide a navigation computer to vector an interceptor to a tally-ho position.

It is another object of the present invention to provide a navigation computer to vector an interceptor to a tally-ho position wherein, assuming constant target velocity, only a single computation is required.

It is a further object of the present invention to provide a navigation computer to vector an interceptor to a tally-ho position along a straight line course which will bring the interceptor into collision with the target at a predicted time and place.

It is still a further object of the present invention to provide a navigation computer of the character described wherein the time and place of collision may be determined.

Other objects and many of the attendant advantages of the present invention will be readily appreciated as the same becomes better understood by reference to the following detailed description when considered in connection with the accompnayning drawings wherein:

FIG. 4 illustrates an embodiment of the present invention.

Figure 1:
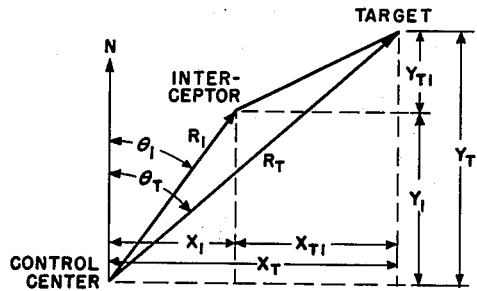
FIG. 1 illustrates and sets forth the equations which are mechanized by the computer to obtain the rectanglar co-ordinates of the target with respect to the interceptor.

In FIG. 1, it may be seen that the positions of the target and the interceptor with respect to the control center may be expressed in polar co-ordinates as:

(1) $\quad R_T/\theta_T$
(2) $\quad R_I/\theta_I$ where $\theta_T$ and $\theta_I$ are measured with respect to an arbitrarily chosen reference direction, for example north.

The positions of the target and the interceptor with respect to the control center may be determined from (1) and (2) and expressed in rectangular co-ordinates as:

(3) $\quad X_T = R_T \sin \theta_T$
(4) $\quad Y_T = R_T \cos \theta_T$
(5) $\quad X_I = R_I \sin \theta_I$
(6) $\quad Y_I = R_I \cos \theta_I$ The position of the target with respect to the interceptor may be determined and expressed in rectangular co-ordinates by subtracting Equation 5 from Equation 3 and Equation 6 from Equation 4:

(7) $\quad X_{TI} = R_T \sin \theta_T - R_I \sin \theta_I$
(8) $\quad Y_{TI} = R_T \cos \theta_T - R_I \cos \theta_I$ Equations 1 and 2 represent the direct input voltages to the computer and, as will be apparent from the detailed description of FIG. 4 below, Equations 3 through 6 are mechanized by the target channel and interceptor channel co-ordinate conversion systems of the computer, while Equations 7 and 8 are mechanized by summing amplifiers to which the co-ordinate conversion systems are coupled.

Figure 2:
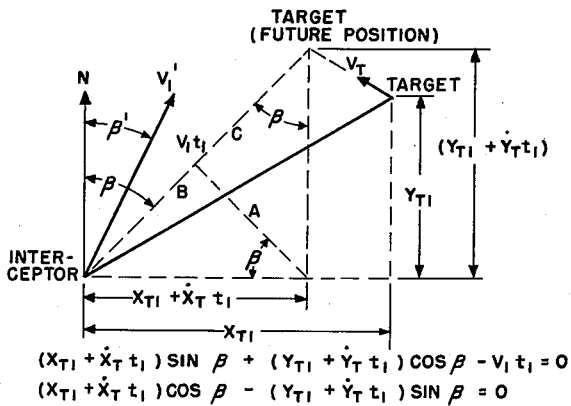
FIG. 2 illustrates and sets forth the equations mechanized by the computer to provide the interceptor bearing order.

Referring now to FIG. 2, equations will be derived that are mechanized by the computer to determine $\beta$ and $t_I$, the course which the interceptor should assume to bring it into collision with the target and the time to collision, respectively:

(9) $\quad A=(X_{TI}+\dot{X}_T t_I) \cos \beta = (Y_{TI}+\dot{Y}_T t_I) \sin \beta$

(10) $\quad (X_{TI}+\dot{X}_T t_I) \cos \beta - (Y_{TI}+\dot{Y}_T t_I) \sin \beta = 0$ where $X_{TI}$ and $Y_{TI}$ represent the present position of the target with respect to the interceptor in rectangular co-ordinates, $\dot{X}_T$ and $\dot{Y}_T$ represent the rectangular components of the target's velocity, $t_I$ represents the time to collision, $\dot{X}_T t_I$ and $\dot{Y}_T t_I$ represent in rectangular form the change in the position of the target in time $t_I$, and $(X_{TI}+\dot{X}_T t_I)$ and $(Y_{TI}+\dot{Y}_T t_I)$ express, in rectangular co-ordinates the position of the target at the time of collision with respect to the present position of the interceptor.

Continuing to refer to FIG. 2, the second equation will be derived:

(11) $\quad B=(X_{TI}+\dot{X}_T t_I) \sin \beta$

(12) $\quad C=(Y_{TI}+\dot{Y}_T t_I) \cos \beta$

(13) $\quad V_I t_I = B + C$

(14) $\quad (X_{TI}+\dot{X}_T t_I) \sin \beta + (Y_{TI}+\dot{Y}_T t_I) \cos \beta - V_I t_I = 0$ where $V_I$ represents the interceptor's velocity along the collision path.

Equations 10 and 14, when simultaneously solved, will give the angle $\beta$ and the interceptor time $t_I$. These are the two expressions given in FIG. 2. Their simultaneous solution is obtained by the computer mechanism hereinafter described with reference to FIG. 4.

Figure 3:
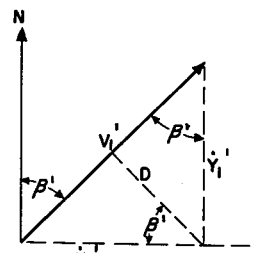
FIG. 3 illustrates and sets forth the equation mechanized by the computer to determine the interceptor's actual course.

Referring now to FIG. 3, an equation will be derived which is mechanized by the computer to determine the uncorrected course of the interceptor.

(15) $\quad D=\dot{Y}_I' \sin \beta' = \dot{X}_I' \cos \beta'$

(16) $\quad \dot{Y}_I' \sin \beta' - \dot{X}_I' \cos \beta = 0$ where $\dot{X}_I'$ and $\dot{Y}_I'$ are the rectangular components of the interceptor's uncorrected velocity $V_I'$ (see FIG. 2).

Referring now to FIG. 4, which illustrates a preferred embodiment of the invention, there is shown a target channel co-ordinate conversion system which comprises a direct current amplifier 12, a modulator 13 coupled to amplifier 12, and a servo-loop comprising a servo-amplifier 14 and a motor tachometer set 16, 17 coupled to amplifier 14 to be driven thereby and sine-cosine potentiometer 19. The electrical output of tachometer 17 is fed back to servo-amplifier 14 to stabilize the operation of the servo-loop. A potentiometer 18 has the wiper arm thereof coupled to the shaft of tachometer 17 to be positioned thereby. The voltage on the wiper arm of potentiometer 18 is fed back to amplifier 12 to stabilize the operation of the system. A sine-cosine potentiometer 19 has the wiper arms thereof coupled to the shaft of tachometer 17 for conjoint rotation therewith. A pair of direct current amplifier 21 and 22 are provided to couple the target radius-vector voltage to sine-cosine potentiometer 19. Potentiometer 19 provides output voltages respectively proportional to $-X_T$ and $-Y_T$. (Additional output voltages proportional to $-X_T$ and $-Y_T$ are provided by potentiometer 19 for a purpose to be later described.)

The interceptor channel co-ordinate conversion system 23 is substantially identical to co-ordinate conversion system 11 and will therefore not be described. It will be noted, however, that sine-cosine potentiometer 24 of the interceptor channel co-ordinate conversion system provides in addition to output voltages respectively proportional to $-X_I$ and $-Y_I$ a voltage proportional to $X_I$ for a purpose to be later described. The interceptor and target channel conversion systems described above are substantially identical to those described and claimed in the above-referenced copending application Serial No. 635,078.

The $-X_T$ output voltage from sine-cosine potentiometer 19 is coupled through a differentiating amplifier 26 to a potentiometer 27 having the wiper arm thereof positioned in accordance with the operation of the $t_I$ servo-loop (to be later described). The voltage on the wiper arm of potentiometer 27 accordingly is proportional to the product of the horizontal component of the interceptor's velocity and the time to collision and thus represents the horizontal displacement of the target in time $t_I$. The $X_T$ and $-X_I$ output voltages from sine-cosine potentiometers 19, 24 and the X component displacement voltage from potentiometer 27 are coupled to a direct current summing amplifier 28 which provides an output voltage proportional to the horizontal component of the target's position at $t_I$ with respect to the interceptor's present position. The output voltage of summing amplifier 28 is coupled directly and through a sign changing direct current amplifier 29 to a sine-cosine potentiometer 31.

The $-Y_T$ voltage of sine-cosine potentiometer 19 is coupled through a differentiating amplifier 32 to a potentiometer 33 having the wiper arm thereof positioned conjointly with the wiper arm of potentiometer 27. The voltage on the wiper arm of potentiometer 33 is thus proportional to the vertical component of the target's displacement in time $t_I$. The $Y_T$ and $-Y_I$ output voltages from sine-cosine potentiometers 19, 24 and the Y component displacement voltage from potentiometer 33 are coupled to a direct current summing amplifier 34 which provides an output voltage proportional to the vertical component of the target's position at $t_I$ with respect to the interceptor's present position. The output voltage of summing amplifier 34 is coupled directly and through a sign changing direct current amplifier 36 to sine-cosine potentiometer 37.

The output voltage of sine-cosine potentiometer 31 proportional to the product of the horizontal component of the target's future position and $\sin \beta$ and the output voltage of sine-cosine potentiometer 37 proportional to the product of the vertical component of the target's future position and $\cos \beta$ are coupled through a direct current summing amplifier 38 to a modulator 39. A servo-loop comprising a servo-amplifier 41 and a motor tachometer set 42, 43 is coupled to modulator 39 to be driven thereby. The shaft of tachometer 43 is coupled to the wiper arm of a potentiometer 44 and to the wiper arms of potentiometers 27, 33. A voltage proportional to the magnitude of the interceptor's velocity (which may, for example, be derived from the interceptor channel co-ordinate conversion system) is applied to potentiometer 44. The voltage on the wiper arm of potentiometer 44, proportional to $-V_I t_I$, is fed back to amplifier 38 to complete the servo-loop. The wiper arms of potentiometers 27, 33 are thus translated to a position proportional to the magnitude of $t_I$ in accordance with Equation 14.

The output voltage of sine-cosine potentiometer 31 proportional to the product of the horizontal component of the target's future position and $\cos \beta$ and the output voltage of sine-cosine potentiometer 37 proportional to the negative product of the vertical component of the target's future position and $\sin \beta$ are coupled to a direct current amplifier 50, the output voltage of which is coupled to a modulator 51. A servo-loop comprising a servo-amplifier 52 and a motor tachometer set 53, 54 is coupled to modulator 51 to be driven thereby. The shaft of tachometer 54 is thus positioned to the angle $\beta$. A potentiometer 56 is provided to convert the shaft position of tachometer 54 to an appropriate analogue voltage for any desired purpose. The shaft of tachometer 54 is mechanically coupled to the wiper arms of sine-cosine potentiometer 31, 37, for conjoint rotation therewith and to one input shaft of a mechanical differential 57.

The output voltage of sine-cosine potentiometer 24 proportional to $X_I$ is coupled to a differentiating amplifier 60 the output voltage of which is coupled directly and through a sign changing direct current amplifier 61 to a sine-cosine potentiometer 62 which provides an output voltage equal to the negative product of the horizontal component of the interceptor's uncorrected velocity and $\cos \beta'$. The voltage output of sine-cosine potentiometer 24 proportional to $-Y_I$ is applied to a differentiating amplifier 63 the output voltage of which is applied directly and through a sign changing direct current amplifier 64 to a sine-cosine potentiometer 66 which provides an output voltage proportional to the product of the vertical component of the interceptor's uncorrected velocity and $\sin \beta'$. The output voltages from sine-cosine potentiometer 62, 66 are applied to a direct current amplifier 67 the output voltage of which is applied to a modulator 68. A servo-loop comprising servo-amplifier 69 and motor tachometer set 71, 72 coupled to modulator 68 to be driven thereby. The wiper arms of sine-cosine potentiometers 62, 66 are mechanically coupled to the shaft of tachometer 72 for conjoint rotation to the angle $\beta'$ in accordance with Equation 16. The shaft of tachometer 72 is further mechanically coupled to the second input shaft of mechanical differential 57 whereby the output shaft thereof is positioned in accordance with the difference between the actual and desired bearing of the interceptor. The output from mechanical differential 57 may be applied to the interceptor's autopilot and/or appropriate indicating equipment such as a pilot's direction indicator 73.

No data smoothing or filtering circuits have been shown in the illustrative embodiment. The required amount of smoothing and the permissible frequency of the data rate may be determined by simulation. When the vectoring computer is located at the control center, data smoothing can be accomplished by the radar systems utilized to obtain target and interceptor position data in which case the need for additional smoothing is obviated. Each of the direct current amplifiers shown (all indicated by a resistor designation) are high gain amplifiers having large amounts of negative feed back to provide near unity gain.

The illustrative embodiment of the invention described employs direct current computing. If desired, alternating current computing may be employed using techniques similar to those described in application Serial No. 635,078.

Obviously many modifications and variations of the present invention are possible in the light of the above teachings. It is therefore to be understood that within the scope of the appended claims the invention may be practiced otherwise than as specifically described.

What is claimed is:

1. A navigation computer comprising: a converting means to convert radar signals proportional to polar coordinates of a first vehicle with respect to a reference point and a reference direction to signals proportional to rectangular coordinates of said first vehicle with respect to said reference point and said reference direction; means coupled to said first mentioned means to provide signals proportional to the rectangular components of the velocity of said first vehicle with respect to said reference point and said reference direction; means coupled to said last mentioned means to provide signals proportional to the rectangular components of the displacement of said first vehicle in a predicted time with respect to said reference point and said reference direction; a converting means to convert radar signals proportional to polar coordinates of a second vehicle with respect to said reference point and said reference direction to signals proportional to rectangular coordinates of said second vehicle with respect to said reference point and said reference direction; means coupled to receive said first vehicle rectangular co-ordinate signals, said first vehicle displacement signals, and said second vehicle rectangular co-ordinate signals to provide signals proportional to the rectangular co-ordinates of said first vehicle with respect to said second vehicle at said predicted time; and means coupled to said last mentioned means to compute a course for said second vehicle which will bring said second vehicle into collision with said first vehicle at said predicted time.

2. The navigation computer of claim 1 including means coupled to receive the signals proportional to the rectangular co-ordinates of said second vehicle to compute the heading of said second vehicle; and means differentially coupled to said last mentioned means and to said course determining means to provide a bearing order for said second vehicle.

3. The navigation computer of claim 1 wherein: said course determining means comprises first and second resolver means respectively energized by said signals proportional to the rectangular co-ordinates of said first vehicle with respect to said second vehicle at said predicted time; a servo-loop coupled to be energized from said first and second resolver means to provide a shaft output; and means mechanically coupling the shaft output of said servo-loop to said first and second resolver means; said servo-loop being energized from said first and second resolver means by signals respectively proportional to $X \cos \beta$ and $(-)Y \sin \beta$, where X and Y are said rectangular co-ordinates of said first vehicle with respect to said second vehicle, and $\beta$ is said course, whereby said shaft output is proportional to said course.

4. The navigation computer of claim 3 including means coupled to receive said signals proportional to the rectangular co-ordinates of said second vehicle to provide a shaft output proportional to the heading of said second vehicle; and means differentially combining the shaft outputs of said last mentioned means and said servo-loop to provide a bearing order for said second vehicle.

5. The navigation computer of claim 3 wherein said means to provide signals proportional to the rectangular components of the displacement of said first vehicle in a predicted time comprises: first and second potentiometers respectively energized by said signals proportional to the rectangular components of said first vehicle's velocity; a second servo-loop coupled to be energized from said first and second resolver means by signals proportional to $X \sin \beta$ and $Y \cos \beta$, said second servo-loop providing a shaft output; a third potentiometer; circuit means applying a negative signal proportional to the velocity of said second vehicle to said third potentiometer; circuit means coupling the wiper arm of said third potentiometer to said second servo-loop; and means mechanically coupling the shaft output of said second servo-loop to the wiper arms of said first, second and third potentiometers, whereby said wiper arms are positioned in accordance with said predicted time.

6. The navigation computer of claim 5 including means coupled to receive said signals proportional to the rectangular co-ordinates of said second vehicle to provide a shaft output proportional to the heading of said second vehicle; and means differentially combining the shaft outputs of said last mentioned means and said first servo-loop to provide a bearing change order for said second vehicle.

7. The navigation computer of claim 6 wherein said means to provide a shaft output proportional to the heading of said second vehicle comprises: means coupled to receive said signals proportional to the rectangular co-ordinates of said second vehicle to provide signals proportional to the rectangular components of said second vehicle's velocity with respect to said reference point and said reference direction; third and fourth resolver means coupled to said last mentioned means to be respectively energized by said last mentioned velocity component signals; a third servo-loop coupled to be energized from said third and fourth resolver means to provide a shaft output; means mechanically coupling said shaft output of said third servo-loop to said third and fourth resolver means; said third servo-loop being energized by signals respectively proportional to $(-)V_X \cos \beta'$ and $V_Y \sin \beta'$, where $V_X$ and $V_Y$ are said last mentioned velocity components and $\beta'$ is said heading, whereby said shaft output of said third servo-loop is proportional to said heading.

References Cited in the file of this patent

UNITED STATES PATENTS

| | | |
|---|---|---|
| 2,600,159 | Ergen | June 10, 1952 |
| 2,714,047 | Dehmel | July 26, 1955 |
| 2,879,502 | Miller | Mar. 24, 1959 |

OTHER REFERENCES

Principles of Guided Missile Design, Van Nostrand Co., 1955, page 563 relied on.